July 1, 1930.                H. GOERLITZ                1,769,022
                   MACHINE FOR UTILIZING STATISTICAL CARDS
                   Original Filed Aug. 30, 1921    6 Sheets-Sheet 1

Hans Goerlitz
Inventor

By  Attorney  H. A. Sparks

July 1, 1930.  H. GOERLITZ  1,769,022
MACHINE FOR UTILIZING STATISTICAL CARDS
Original Filed Aug. 30, 1921  6 Sheets-Sheet 2

Hans Goerlitz, Inventor
By Attorney W. A. Sparks

July 1, 1930.                    H. GOERLITZ                    1,769,022
                    MACHINE FOR UTILIZING STATISTICAL CARDS
                    Original Filed Aug. 30, 1921    6 Sheets-Sheet 4

WITNESS
D. A. Carpenter

INVENTOR
Hans Goerlitz
BY Robert H. Strother
ATTORNEY

July 1, 1930.   H. GOERLITZ   1,769,022
MACHINE FOR UTILIZING STATISTICAL CARDS
Original Filed Aug. 30, 1921   6 Sheets-Sheet 5

WITNESS
D. A. Carpenter

INVENTOR
Hans Goerlitz
BY Robert H. Strother
ATTORNEY

July 1, 1930.                    H. GOERLITZ                    1,769,022
                     MACHINE FOR UTILIZING STATISTICAL CARDS
                     Original Filed Aug. 30, 1921    6 Sheets-Sheet 6

Patented July 1, 1930

1,769,022

UNITED STATES PATENT OFFICE

HANS GOERLITZ, OF ROTTERDAM, NETHERLANDS, ASSIGNOR TO ACCOUNTING AND TABULATING MACHINE CORPORATION, OF NEW YORK, N. Y., A CORPORATION OF DELAWARE

MACHINE FOR UTILIZING STATISTICAL CARDS

Original application filed August 30, 1921, Serial No. 496,944, and in Germany June 6, 1918. Divided and this application filed March 19, 1927, Serial No. 176,766. Renewed March 24, 1930.

The present application relates to machines for handling statistical cards of the type which are fully described and claimed in my co-pending application, Ser. No. 496,944, filed August 30, 1921, of which the present application is a division.

The invention that is the subject of this divisional application consists of mechanism which is hereinafter described and which the claims cover, and which may have different forms. Illustrative forms of card-punching mechanism, mechanical card-sorting mechanism, and electrical card-sorting mechanism are shown herein, each of which forms represents the invention embodied in a machine.

In the accompanying drawings which illustrate both mechanism and related statistical cards and in which like reference numerals designate like parts in different views:

Figs. 8, 9, 10, 10$^a$, 11, 12 and 12$^a$ illustrate statistical cards to each of which particular reference is hereinafter made.

In their broad aspects the phases of the invention claimed in the present application are applicable either to punch machines or to tabulating machines. In one case the punches pass through the cards and in the other case fingers or feelers pass through preformed openings. I intend to refer to either of these types of mechanisms by the phrase "members adapted to pass through the cards," and to cover the invention used either in a punch or a tabulating machine.

Each of the illustrated statistical cards is provided with different systems of perforations which are used in succession for the tabulating action, one of the two systems occupying those spaces or interstices which, either for the required distance between the perforating punches—in mechanically operating machines—or for the required interval between two subsequent perforations—in electrically operating machines—, necessarily must remain free from holes or perforations. The machines, however, are provided with devices for controlling the same, as desired, for action in connection with the one or the other one of the two systems of perforations.

Figure 8:
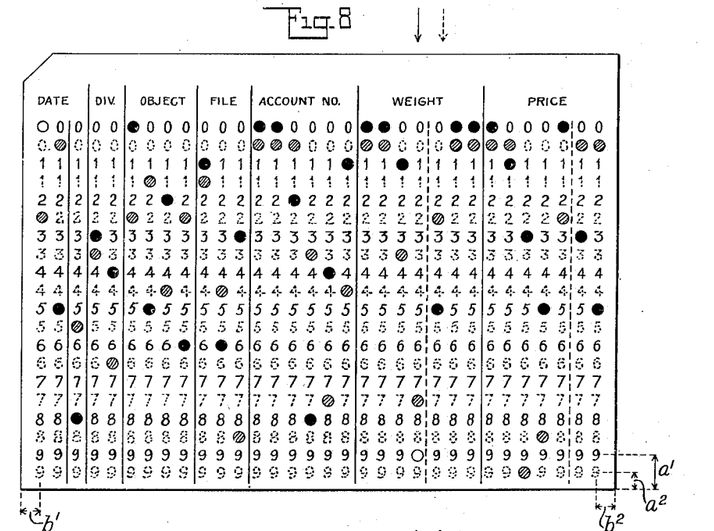

Figure 8 represents a perforated card which, in lieu of the usual ten horizontal lines or series of numerals, is provided with twenty lines or series, the numerals of the one set or system of lines being shown in full lines and the numerals of the other set or system being shown in dotted lines. The numerals or perforations of the one system are located in the spaces between the numerals of the vertical lines of the other system. In both systems the numerical order from 0 to 9 goes from top to bottom. The vertical lines dividing the card into a number of separate fields and also the headings or inscriptions at the top are common to both systems, $a^1$ and $a^2$ denoting the distances of the two lines comprising the numeral 9 only, from the adjacent edge or margin of the card. The distances $b^1$ and $b^2$ of the two outer vertical lines of numerals from the edges of the card are equal.

Figure 9:
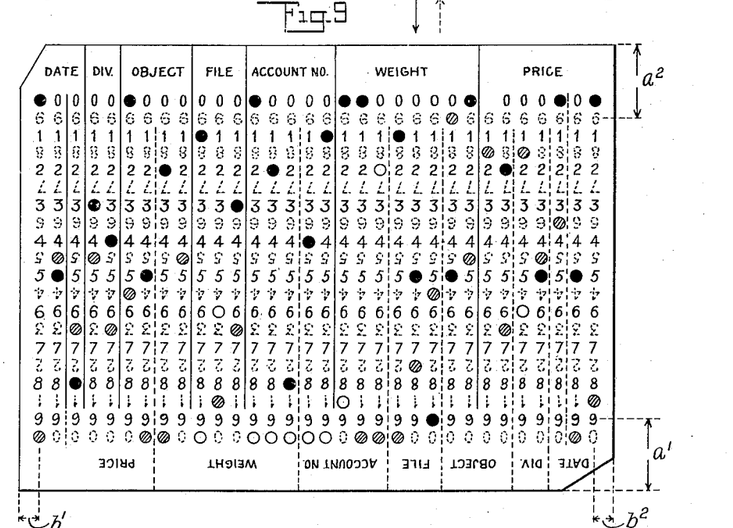

Figure 9 represents a card likewise with two systems of numeral lines as before. The numerals and perforations of the one system are also located in the spaces between the numerals of the vertical lines of the other system. But while in the one system the numerical order from 0 to 9 goes from top to bottom, in the other system the card must be turned for 180° to read from top to bottom. As diagonally opposite corners of the card are cut off differently, it may be determined at a glance how the card should be laid in the pile in either of its two proper positions, and that it should be turned whenever it lies in the undesired position, and it is made readily distinguishable from cards like those shown in Figs. 8, 10 and 12. In each system separate vertical dividing lines and separate headings or inscriptions on top of the columns thus obtained are necessary. The distances $a^1$ and $a^2$ are alike and the distances $b^1$ and $b^2$ are also equal just as in Figure 8.

Figure 10A:
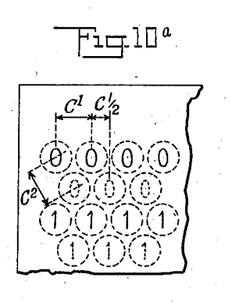

Figure 10 shows a card similar to that in Figure 8 with the exception that the numerals and perforations of the lines of the one system are arranged vertically above or below the intermediate spaces of adjacent perforations of the other system. This arrangement affords a more advantageous utilization of the paper than in Figure 8. A maximum advantage is obtained by keeping the distance $c^1$, Figure 10$^a$ equal to the distance $c^2$. $a^1$ and $a^2$ denote the distances of the line 9 from the adjacent edge or margin of the card, and $b^1$ and $b^2$ denote the distances of the vertical outer or end lines of numerals from their adjacent edges of the card.

Figure 11 represents a card which is a combination of the cards shown in Figures 9 and 10. The perforations of the same characters in the one system are located vertically below or above the interstices between adjacent holes of the other system. The numerical order of the characters or perforations from 0 to 9 increases in the one system, from top to bottom, and in the other system likewise from top to bottom upon turning the card for 180°. The distances $a^1$, $a^2$, $b^1$, $b^2$ are of like nature as in Figures 9 and 10.

Figure 12:
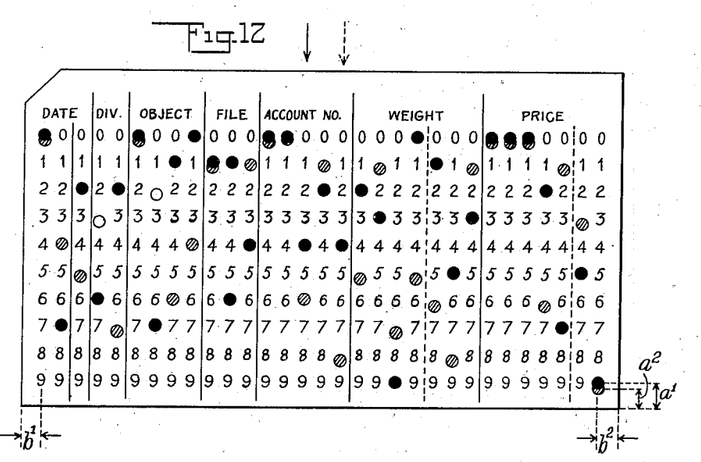

Figure 12 illustrates a card similar to that in Figure 8 except that the perforations are not juxtaposed but eccentrically superposed, and the numerals need not be printed except in single lines or rows. The distances $a^1$, $a^2$, $b^1$, $b^2$ are of the same nature as in Figure 8. The above described arrangement of the perforations in eccentric superposition is also applicable in the cards shown in Figures 9 and 10.

Figure 12A:
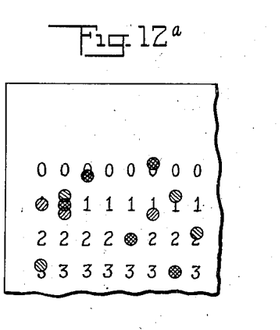

Figure 12$^a$. If in the card shown in Figure 12 a third perforation is applied in eccentric superposition, the card is utilizable for three systems.

The numerals of the single systems may be printed on one side of the card only, or one side thereof may be used for the print of the one system and the other side for the second system. As the printed numerals are only an auxiliary means for the eye of the reader and as the known automatic summing machines with printing mechanisms may be so constructed as to perforate holes in the shape of numerals, also cards without any printed numerals may be used.

According to whether the cards are to be worked in machines having a punching box or in an electrically driven machine having a brush to wipe over the card or any other appropriate feeling member, in the use of some of the above described cards controlling arrangements are necessary for ensuring that, as desired, only the perforations of the one or those of the other system actuate the controlling members of the machine. Arrangements or devices for the purpose are described in the following portion of this specification in connection with a mechanical machine and with an electrically operated machine. But before the machines and the said controlling arrangements are explained in detail, it will be useful to describe the manner in which punching or perforating machines are constructed and made applicable for producing perforations of the one or the other numeral system.

Figure 1:
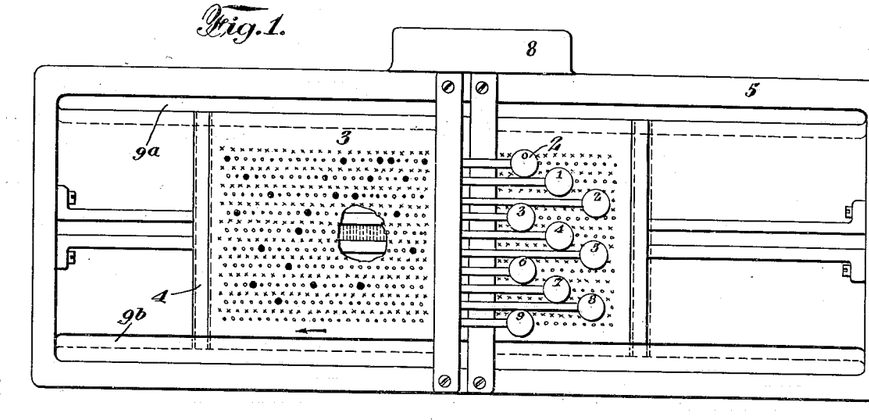
Fig. 1 is a plan of card-punching mechanism including a slide, carrying a partly punched card.
Figure 2:
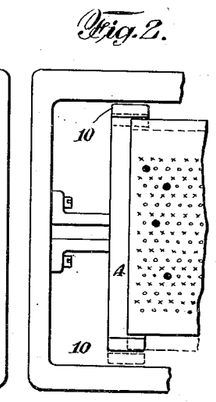
Fig. 2 is a fragmental plan of this mechanism, the slide and card being in other positions.
Figure 3:
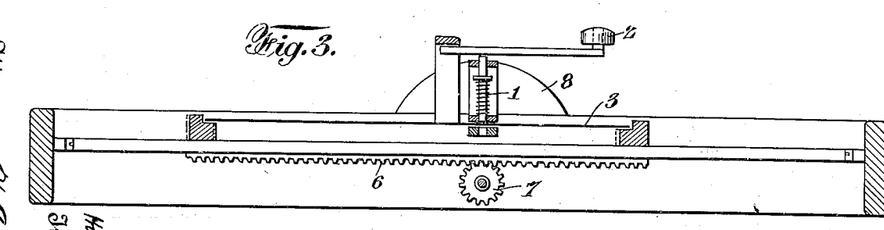
Fig. 3 a sectional elevation thereof.

In the simple manually operated perforating apparatus the card, enclosed in a frame, is stepwise advanced below ten juxtaposed punches, provided with knobs for depressing said punches, and the card must be able to be so fastened in the frame, so that the numbers of the systems on which perforations are to be made, are positioned below said punches. An apparatus of the kind is shown in Figures 1, 2 and 3.

The punches 1 are arranged in a series under the control of punching levers with knobs 2. On depression of a lever the corresponding punch is forced down to make a perforation in the card 3. The latter is kept in place on a slide 4 adapted to be moved lengthwise in the stationary frame 5. On the depression of a knob 2 a rack 6 and pinion 7 cause, under the action of a spring in the casing 8 and of a pawl and ratchet wheel not shown, the said slide 4 with the card to advance one step, as is known in the art. Laterally the card is guided by the ledges 9$^a$ and 9$^b$ of the frame. The members constituting the slide 4 are adjustable and the ledges 9$^a$ and 9$^b$ are removable and adjustable in a known manner, so that the card 3 can be properly positioned below the punches 1 to receive the perforations in the desired system of numerals. In lieu of the ledges 9$^a$ and 9$^b$ short arms 10, Figure 2, may be employed in connection with the slide 4.

In order to perforate cards of the kind shown in Figures 8, 9 and 12 only the ledges 9$^a$ and 9$^b$ require to be changed to suit the particular nature of the card. The ledges must allow any change in the position of the card vertical to the feeding movement to the amount of $a^1$ and $a^2$, but in order to perforate cards of the kind shown in Figures 10 and 11 the slide 4 must be so constructed and arranged as to allow of adjusting same in longitudinal (feeding) direction to the amount of $b^1$ and $b^2$.

The mechanically operated perforating machines of the usual known construction comprise a card magazine, a punching box, a container for the punched cards and a mechanical power drive for the automatic conveyance of the cards and for the actuation of the punches. These machines, therefore, are similar to the mechanical sorting and summing machines to be described herebelow in which in lieu of a punch-box a pin-box is provided. As regards the movability of the card (receiving) container and the adjustability of the stops of the pin-box in the latter machines, similar arrangements are usually provided in the aforementioned mechanically operated perforating machines.

*Mechanically operated summing and sorting machine or pin-box machine*

Figure 4:
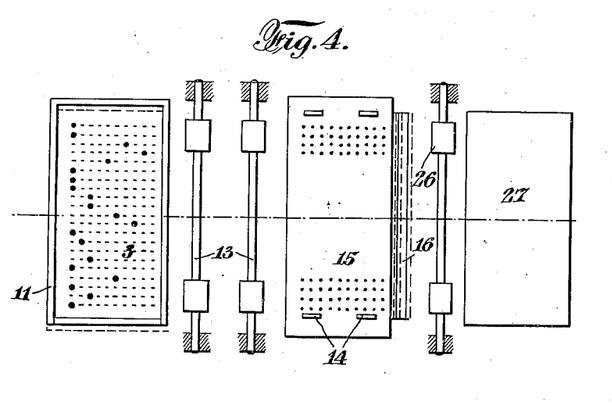
Fig. 4 a plan of portions of mechanically operated card-sorting mechanism.
Figure 5:
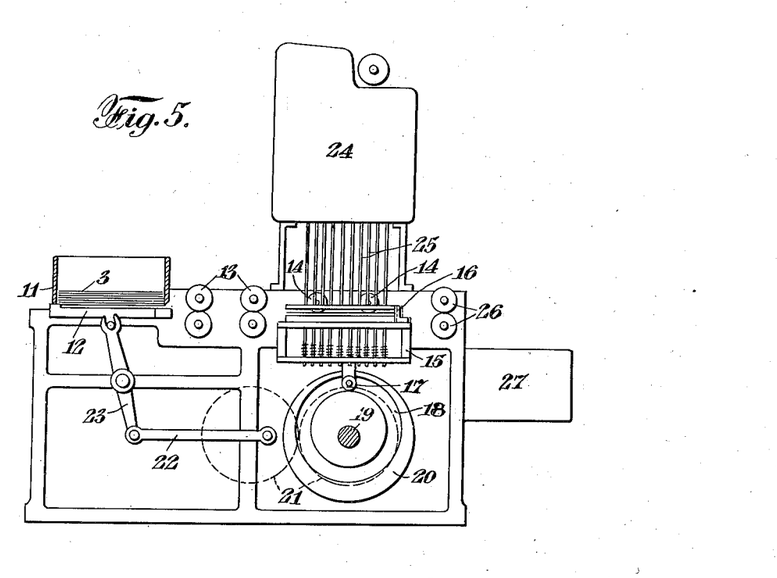
Fig. 5 a sectional elevation of these and other portions thereof.

A machine of this kind is illustrated in Figures 4 and 5 of the drawings. The container 11 receives the cards 3 which singly are delivered by the gripper 12 to the transporting rollers 13 and 14, to be conveyed to the pin box 15, where they are arrested by the stop 16. The pin box is reciprocated in vertical direction by two rollers 17 engaging in cam grooves 18 of the two disks 20, keyed to a shaft 19 driven by a motor of any appropriate kind. The shaft 19 also acts to reciprocate the gripper 12 by means of two toothed wheels 21, a connecting rod 22 and a two-armed lever 23. When moved upwards the pins of the pin-box 15 engage in the perforations of the card, lifting the rods 25 connected with the members of the summing machine 24. At the downward movement of the pin-box 15 the stop 16 also goes down and the card 3 is free to continue its travel, that is to say, the rollers 14 and 26 then act to convey and deliver the card to the gathering container 27.

In case of normal cards having ten horizontal lines of numbers the container 11 and the stop 16 are adjusted to convey and hold the card in the pin-box in a manner that the numerals printed on the card and the perforations therein register or coincide with the pins. The median line of the container 11 and that of the pin-box 15 coincide. The stop 16 is as far remote from the extreme series or line of pins as the extreme series or line of numerals on the card is distanced from the card edge.

I shall now describe the manner in which the container 11 and the stop 16 are adjusted for working the one or the other of the two systems, as desired, in order that the cards assume and hold the proper position with relation to the pin. In Figures 4 and 5 the two positions are shown in full drawn lines and in dotted lines respectively.

In case of cards as in Figure 8 the two systems of numerals are located symmetrically to the median line of the card. The receiving container 11, therefore, remains constantly in its normal position. The stop 16, however, must be adjustable in the card feeding device to the amount of $a^1$ and $a^2$ in order that the correct perforations are always positioned above the pins.

This also holds for cards as in Figure 9, but, in case of working the second system, the card is to be introduced into the machine after having been turned for 180°.

Cards of the kind shown in Figure 10 also require an adjustable stop 16. As the median lines of the two systems are a distance like $b^1-b^2$ or $1/2\ c^1$, apart from each other, also the card container 11 must be adjustable to that amount in a direction perpendicular to the feeding direction.

For cards as in Figure 11 the stop 16 must likewise be adjustable to the amount of $a^1-a^2$. The card container, however, is not adjustable for both systems, but its median line is located an amount $1/2\ b\ (b^1-b^2)$ or $1/4\ c^1$ laterally to the median line of the pin box, for the following reasons.

The median line of the one system is separated from that of the other system by $1/2\ c^1$ or, since $1/2\ c^1$ is equal to $b^1-b^2$, the distance between the two median lines is like $b^1-b^2$. The common median line of the two systems lies symmetrically in the middle between the median lines of the two systems and consequently at a distance like $1/2\ (b^1-b^2)$ from the latter. To cause the median line of the card container 11 to coincide or register with the median line of the one system, the container must be displaced laterally for $1/2\ (b^1-b^2)$. As the card for working the other system is introduced into the machine on having been turned for 180°, the median line of the system again falls laterally upon the same side of the common median line. The card container 11, therefore, remains for both systems laterally displaced for $1/2\ (b^1-b^2)$. With regard to the card shown in Figure 11 this displacement lies to the left with relation to the feeding direction.

The card shown in Figure 12 and having eccentric perforations in both systems is obtained from the solutions 8—11 by approaching the numerals or perforations. As regards the adjustability of the card container 11 and stop 16 all that holds which has been stated above in regard to card 8.

The statements given above with respect to the mechanical summing or adding machine with pin-box also hold for the mechanical sorting machine with a single series of pins and for the mechanically operated perforating machine in which a punch-box is provided in lieu of a pin-box. All that has been said above with relation to machines having a mechanically operated pin-box also holds for the pin-box machines, in which the pins feeding through the cards act to close an electrical contact in lieu of bringing about a mechanical feeding operation.

5 Electrically operated summing and sorting machines (machines with sliding contacts)

Machines of this kind are provided, as is well known, with contact brushes or springs, below which the card is fed and which act to close a circuit at the moment when the brush or spring engages a metal contact or a metal roll through a perforation of the card.

As in the cards shown in Figure 12 two perforations or holes are superposed, care must be taken that the circuit be not closed except in the perforation of that system on which the card is to be worked. Further the brushes must be adjustable in a direction perpendicular to the feeding direction in a manner that, in case of working cards as shown in Figures 10 and 11 the brushes allow of being positioned or adjusted to the median lines of the vertical lines or series of the one or the other system.

Figure 6:
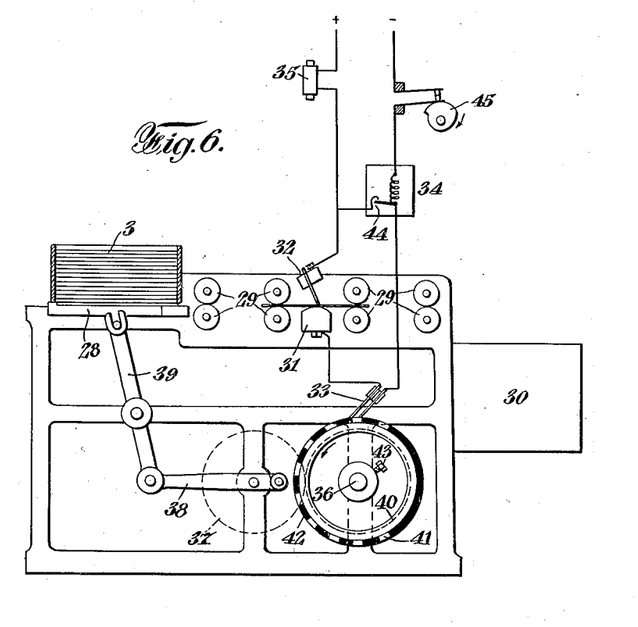
Fig. 6 a sectional elevation of portions of electrically operated card-sorting mechanism.
Figure 7:
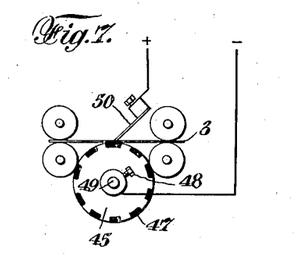
Fig. 7 a side elevation of portions of electrically operated card-sorting mechanism differing from that shown in Fig. 6.

In Figures 6 and 7 the electrically operated statistic summing machine is illustrated diagrammatically, in order to show in which manner the holes or perforations of the system that is not to be used or worked, are rendered electrically inactive or inoperative.

The cards 3 are, as before, seized one by one by the gripper 28 and conveyed or fed over rollers 29 to the container 30 at the other end of the machine. On their travel the cards pass between the brush 32 and the contact 31 of the electric circuit including the double brush 33, a relay 34 and the magnet 35 of the summing device. The drive of the device is effected by the shaft 36. Pinion 37, a connecting rod 38 and a lever 39 serve for the actuation of the gripper 28 through said shaft. Fixed to the shaft 36 by means of a screw 43 is a ring 40 having ten metal strips 41 and ten insulating strips 42 to constitute its periphery. The screw allows of adjusting the ring to the angular amount of the strips 41 or 42, so that the periods of closing and opening the circuit can be changed or substituted for each other. In this manner the brush 32 can be made to contact with the metal piece 31 through the perforations or holes of either the one or the other system of the card, as desired, so that a perforation or hole of the system that is not intended to influence the recording activity of the machine, cannot cause the circuit to be closed, not even in case that such perforation passes the brush first.

The relay 34 serves the purpose of keeping the circuit closed across the contact 44 at the moment when a current flows through it, until, after the card has passed through, the contact 45 acts to keep the circuit open until a fresh card engages between the brush and the metal contact 31. Just as in the hereinbefore described machines with a pin-box the card container of this machine is mounted so as to be adjustable across the feeding direction, in order that the brushes may be caused to slide exactly over the centres of the perforations or holes of the cards shown in Figures 10 and 11.

Owing to the difference in the distance of the holes of like value in the two systems from the edge or margin of the card the circuit is closed at a certain perforation, say 5, of one system earlier or later than at the same perforation in the other system. As this asynchronism renders it impossible to correctly actuate the summing and sorting mechanism rotating synchronously with the main drive of the machine, the card must, for the one system, be conveyed through the electric contact device with a certain lead or in advance and for the other system with a certain retardation. To this end the gripper 28, Figure 6, is adapted to be given a corresponding adjustment to the amount of $a^1$—$a^2$ in advancing or retarding relation by altering the engagement or mesh of the pinions 37 operating the gripper.

Instead of compensating for the above said asynchronism in the manner described, the like purpose may be attained by rendering the bar supporting the brush 32 or any other suitable feeling member, adjustable to the amount $a^1$—$a^2$ in the direction of the travel of the cards.

In an electric sorting machine with but one brush sliding over a revolving contact roll and in which different switches of the sorting containers are opened, according to the moment of the closing of the circuit, likewise a revolving sliding ring having peripheral contact pieces and insulating pieces, may be employed. A more convenient construction, however, comprises a revolving contact roll 46, Figure 7, with peripheral insulating pieces 47 and with a screw 48 for adjustably positioning the said roll on its shaft in a manner that only through the holes or perforations of one system of the card 3 the circuit can be closed by means of the brush 50. The latter is adjustable vertically to the feeding direction of the card so as to be capable of being positioned exactly over any vertical line or series of numerals of the card.

The card as described has two or more groups of index point locations, either of which may completely fill the card, the index points of one group being interspersed with the index points of the other group. The mechanism which is the subject matter of this application is applied to machines of standard construction and comprises means in punching machines for controlling the relation of the card to the punches so that the perforations will be made in the index point locations of either of the groups as desired, and comprises means in sorting and tabulating machines for controlling the relation of the card to the feelers so that the feelers will sense the index points in either group to the exclusion of those of the other group. Any one of the two or more groups of index point locations can be selected at will and the groups will be referred to in the claims as selective.

What I claim is:

1. A statistical machine for use with cards having selective groups of index point locations each group comprising index point locations that are interspersed with index point locations of the other group, said machine comprising devices adapted to be associated with the index point locations of either group, and means for controlling the relation between said devices and a card to cause the devices to be associated with the index point locations of one group or the other.

2. A statistical machine for use with cards having selective groups of index point locations each group comprising index point locations that are interspersed with index point locations of the other group, said machine comprising feelers adapted to pass through holes in index point locations of either group, and means for controlling the relation between said feelers and a card to cause said feelers to sense holes in the index point locations of one group or the other.

3. A statistical machine for use with cards having selective groups of index point locations each group comprising index point locations that are interspersed with the index-point locations of the other group, said machine comprising a supply magazine, card feeding mechanism and card sensing mechanism, certain of said elements being adjustable laterally of the path of travel of the card to selectively control the relation of the card to the sensing mechanism to cause the machine to analyze one or the other group of index point locations.

4. A statistical machine for use with cards having selective groups of index point locations each group comprising index point locations that are interspersed with the index point locations of the other group, said machine comprising a supply magazine, card feeding mechanism and card sensing mechanism, certain of said elements being adjustable in the direction of travel of the card to control the relation of the card to the sensing mechanism to cause the machine to analyze one or the other group of index point locations.

5. A statistical machine for use with cards having selective groups of index point locations each group comprising index point locations that are interspersed with the index point locations of the other group, said machine comprising a supply magazine, card feeding mechanism and card sensing mechanism, and means for effecting relative adjustment of said elements laterally and longitudinally of the path of travel of the card to selectively control the relation of the card to the sensing mechanism to cause the machine to analyze one or the other group of index point locations.

HANS GOERLITZ.